Jan. 17, 1928. 1,656,286
E. A. MOLLNOW
NUT TAPPER
Filed Jan. 26, 1926 4 Sheets-Sheet 1
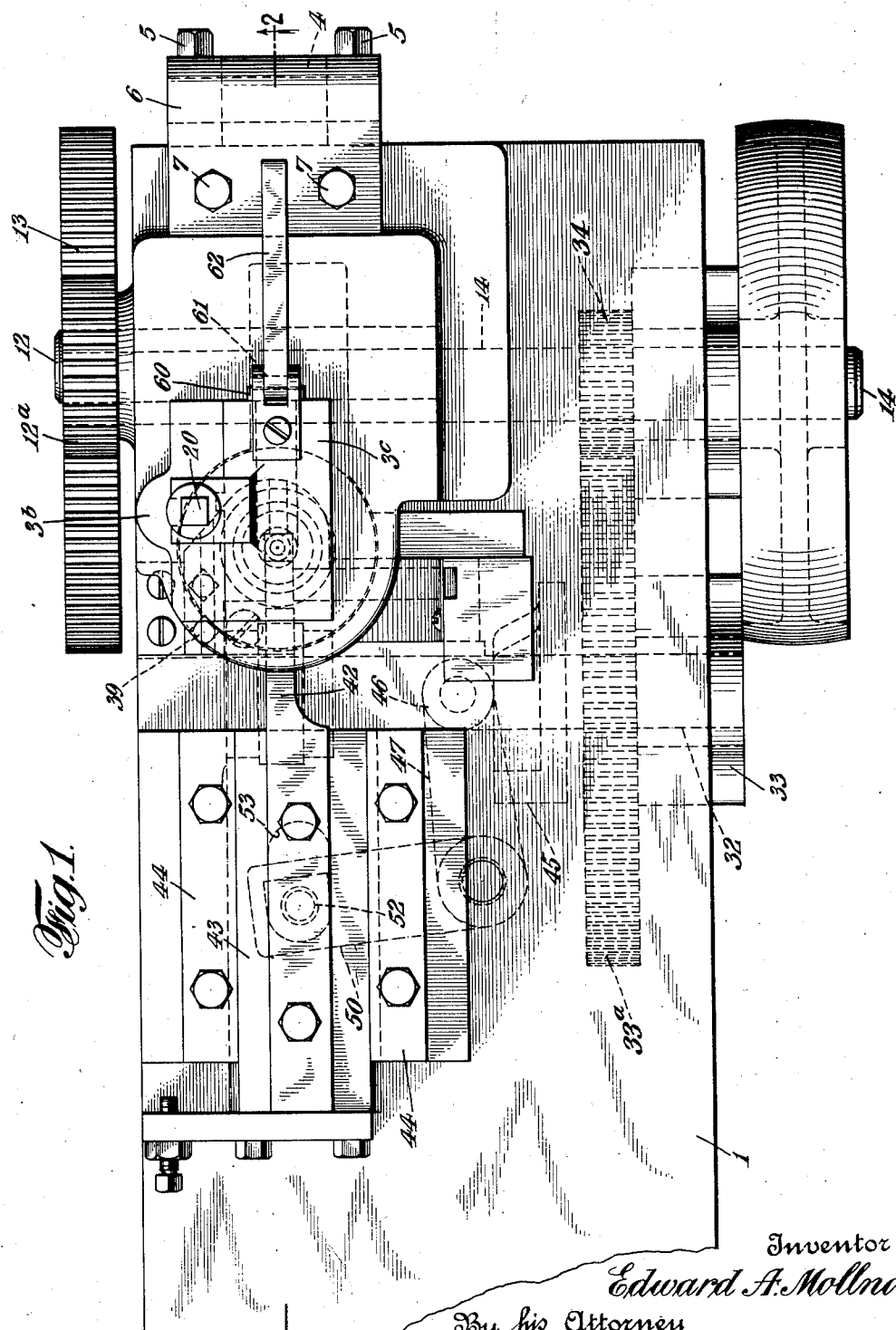
Inventor
Edward A. Mollnow
By his Attorney

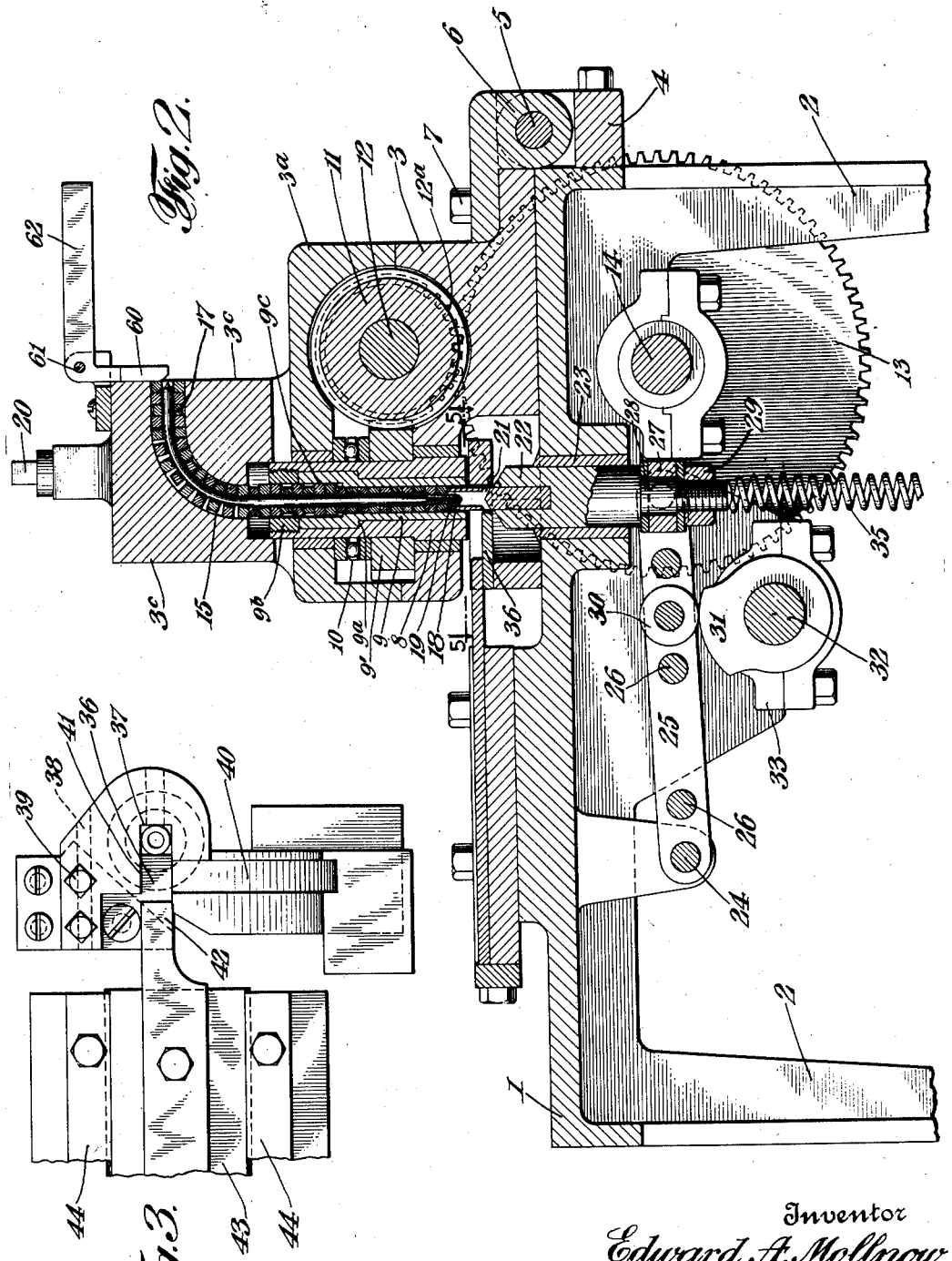

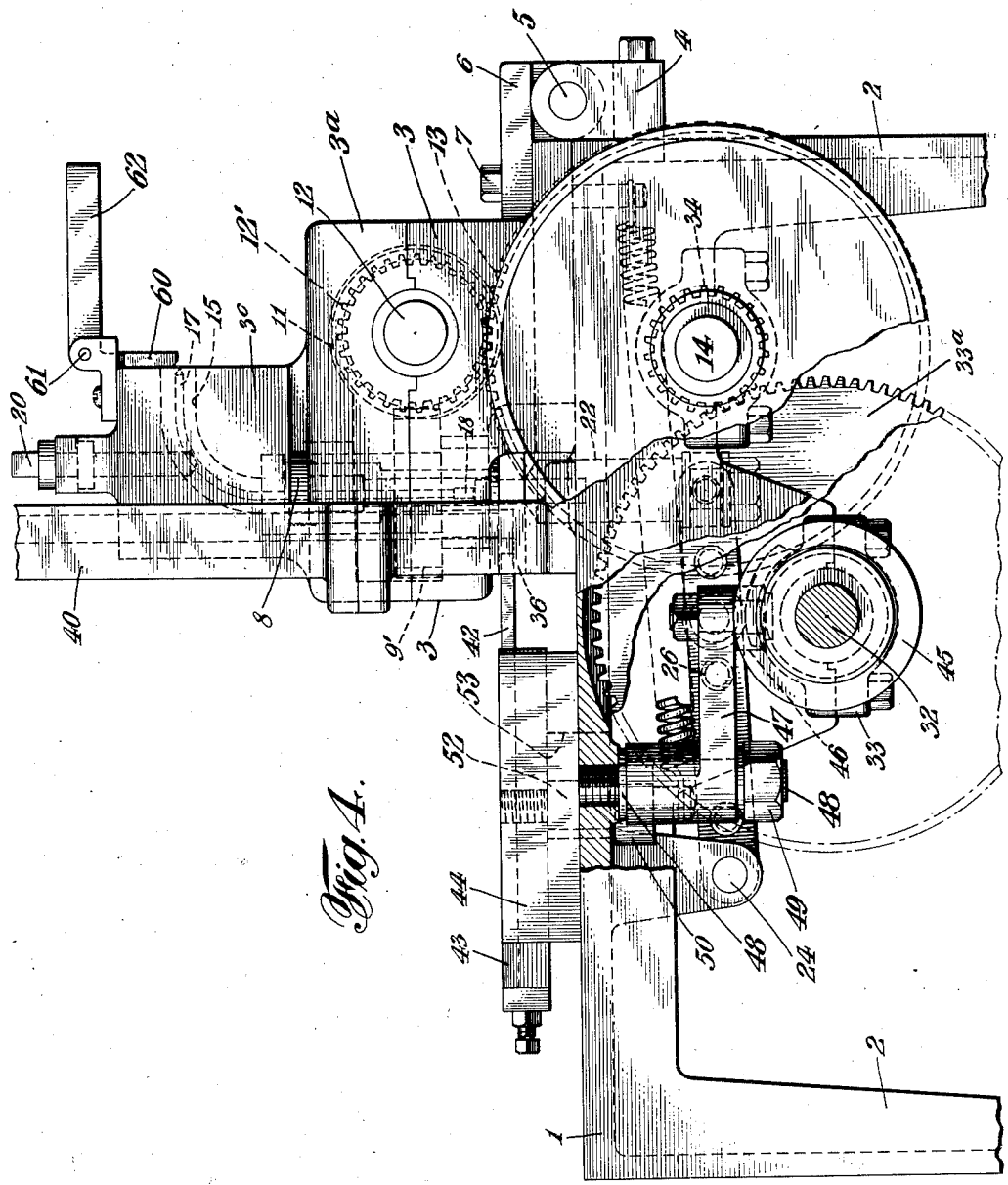

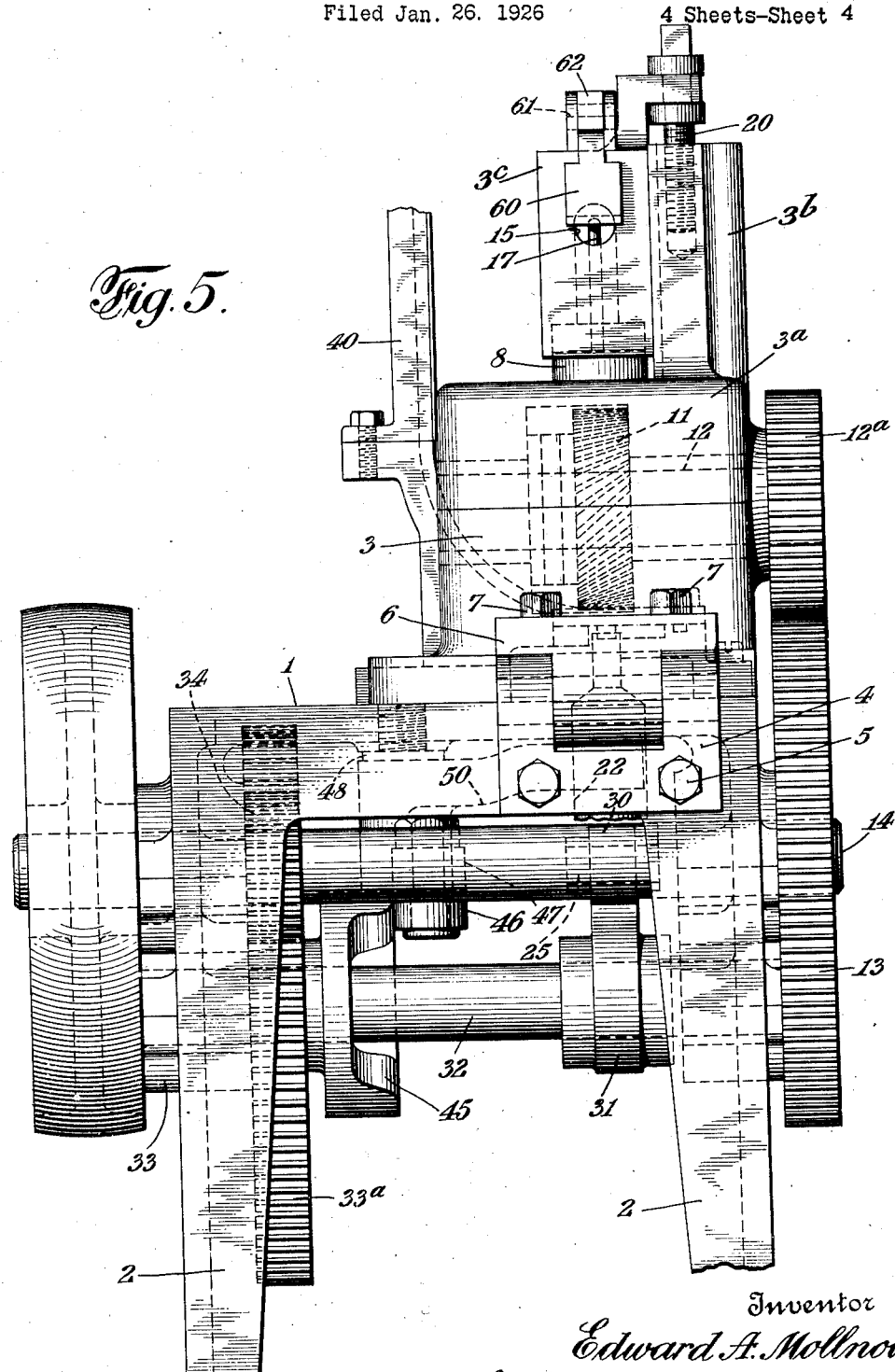

Patented Jan. 17, 1928.

1,656,286

UNITED STATES PATENT OFFICE.

EDWARD A. MOLLNOW, OF NORTH TONAWANDA, NEW YORK, ASSIGNOR TO BUFFALO BOLT COMPANY, OF NORTH TONAWANDA, NEW YORK, A CORPORATION OF NEW YORK.

NUT TAPPER.

Application filed January 26, 1926. Serial No. 83,816.

My present invention relates to machines for interiorly screw-threading perforated nut blanks, but certain features of the invention are applicable to operations of various kinds on articles other than nut blanks.

The invention involves the use of a tap and the nuts are fed onto the tap and threaded in continuous succession, the tap being so supported that the nuts can pass rearwardly along the shank of the tap by continuous movement in one direction, thereby avoiding the delays incident to use of a tap which requires reverse screwing to free the nut therefrom.

While automatically shifting mechanism might be employed for intermittently gripping the tap to permit such one direction movement of the tapped nuts, I prefer what may be termed a floating tap, that is, one which is centered and prevented from rotation by the train of tapped nuts on the shank thereof. In order to prevent rotation, the shank is curved, preferably through an angle of 90°, and is located in a correspondingly curved guideway approximately fitting the maximum diameter of the nuts, but with reasonable clearance, so that the train or stream of nuts, interiorly guided by the shank of the tap and exteriorly guided by the surrounding passage, constitutes the sole holding means for the tap. This leaves the far end of the shank free for exit of the successive nuts at the far end of the train, as fast as the train is advanced by the addition of a new tapped nut at the tap end of the train.

Preferably, the tap and adjacent portion of the shank are vertical so that gravity holds the superposed nuts in train. This is not necessary, however, since the outlet of the nut guide may be provided with an automatic latch applying back pressure on the train of nuts from the exit end thereof, but adapted to yield and permit escape of the nuts successively under pressure of nuts added at the tap end.

While the tap might be revolved by revolving the curved guideway, nuts and shank therein, I prefer to rotate a portion of the guideway adjacent the tap, said guideway being squared or hex-angled to fit the preiphery of the nuts and serve as a rotating chuck therefor.

The complete mechanism includes means for automatically lifting the nuts into engagement with the tap in said rotating chuck, a centering and squaring recess or placer about the pusher, and a transverse feed plunger in front of which the perforated nut blanks are automatically supplied, preferably by gravity pressure of a train of said nuts maintained in an inclined or vertical guideway which may be kept filled with nuts, from a hopper, by well known automatic feed mechanism not shown.

An important feature of the invention is hinging the tap and chuck mechanism and driving means so that it can be turned back to expose the feed and pusher mechanism.

The above and other features of my invention will be more evident from the following description in connection with the accompanying drawings, in which Fig. 1 is a top plan view of the machine;

Fig. 2 is a vertical section on line 2—2, Fig. 1;

Fig. 3 is a detail plan view looking downward on the line 5—5, Fig. 2;

Fig. 4 is a side elevation with parts broken away on a plane parallel with the plane of Fig. 2; and Fig. 5 is a rear elevation of the entire machine.

The machine preferably comprises a horizontal table or bed, 1, mounted on suitable legs, 2, 2, serving as support for the driving mechanism located below the table and for the work engaging mechanism above the table. The main operating parts of the threading tapper are carried by a massive support, 3, which may be secured above the table in any desired way, but preferably it merely rests on the upper surface thereof, being aligned and guided by a massive hinge joint shown at the rear of the table in Figs. 2 and 4 as comprising a bracket, 4, for horizontal pivot pin, 5, and rotatable hinge member, 6, secured as by bolts 7 to the rear end of the support, 3, which rests on the surface of the table. The forward end of 3 is overhung to afford a horizontal downwardly presented surface through which the nut blanks are applied to the screw tapping mechanism carried thereby. Support 3 carries upper support section, $3^a$, which has provided above the same the upright guideway, $3^b$, (Fig. 5), in which is adjustably mounted a third massive support element, $3^c$.

The nut tapping parts carried by this hinge support structure, 3, $3^a$, $3^b$ and $3^c$, are shown in Fig. 4, the rotary stock or chuck carrier, 8 having an inner, removable chuck 9 held against shoulder, 9ª, by screw bushing, 9ᵇ, the lower part of the chuck being square to fit the nuts and the upper part being circular and of a diameter to slidably fit the corners of the nuts in any angular position which they may assume. The stock, 8, is rotated by pinion, 9', the lower surface of which engages support 3, and the upper surface of which engages a roller thrust bearing, 10, between it and the upper support section 3ª. This pinion is driven by spiral gear, 11, on shaft, 12, journaled at the dividing line between support section 3 and 3ª, and it is driven by pinion 12ª meshing with gear 13 on main drive shaft 14.

In alignment with the upper outlet end of the chuck is a nut guiding passage, 15, in support member, 3ᶜ, which gradually curves through an arc of 90° to an outlet, 16, through which the nuts are discharged. In the axis of the chuck, 9, and curved passageway, 15, is the curved shank, 17, carrying at the lower end thereof the screw tap, 18, onto the lower end of which the nut blanks are forced by vertical pusher, 19. As the shank, 17, is more or less springy and is centered entirely by the nuts which must be a fairly loose fit in the passageway, I find it desirable to provide for vertical adjustment of the threaded cutting end, 18, with respect to the pusher 19, by making the support 3ᶜ, containing the curved section of the guideway vertically adjustable on support 3ᵇ, by means of screw 20.

The vertical pusher, 19, for engaging the nuts within the chuck, 9, and forcing them into screwing engagement with the tap, 18, has a vertical axial passage to accommodate the tap and is preferably formed with lateral outlets, 21, for escape of chips.

The pusher is removably mounted in slide, 22, which reciprocates in vertical guides, 23, in table, 1. The means for reciprocating it is shown as comprising a lever pivoted at 24, comprising longitudinal members, 25, rigidly connected by suitable spacers, 26, having pivoted therein a yoke, 27, encircling a reduced extension, 28, at the lower end 22 and held against the rear end of the latter by nut, 29. The lever is positively operated in the upward direction through anti-friction roller, 30, by cam, 31, on shaft, 32, journaled in bracket, 33, depending from table, 1. Shaft 32 is driven by gear 33ª from pinion 34 on the main drive shaft 14. The slide, 22, is retracted by gravity assisted by retracting spring, 35. It will be obvious, however, that the pusher might be spring pressed upwardly and cam retracted, if desired.

Nuts may be placed on the vertical pusher, 22, by hand, but I prefer to provide just above the lowermost position of the pusher, a horizontal surface, 36, in operative relation to a centering guide or placer, 37, which is removably and adjustably held in a guideway, 38, by suitable bolts, 39. The nut supporting surface, 36, may be supplied with nuts in continuous train from gravity slide, 40, whereby successive nuts are pressed into contact with gauge surface, 41. When in this position, a horizontal pusher, 42, carried by slide, 43, operates transversely to push the nut over the vertical pusher, 19, when the latter is in the retracted or lowermost position, the lateral surface of pusher, 42, holding back the train of nuts until retreat to the position shown in Figs. 2 and 3. Pusher, 42, is removably mounted on slide 43, reciprocating in guideways, 44, said slide being operated by cam, 45 (see Figs. 1 and 5), engaging roller, 46, on a bell crank lever, shown in Figs. 1 and 4 as comprising the power arm, 47, held on pivot stud, 48, by nut, 49. The working arm, 50, of the bell crank operates the slide through a stud, 52, playing in slot, 53, shown in dotted lines in Fig. 4.

For affording back pressure on the train of nuts in guide passage, 15, and for preventing nuts from falling out when carriage 3 is rotated about pivot 5, I provide a latch, 60, pivoted at 61 and yieldingly sustained as by a bell crank weight arm, 62.

All parts for direct operation on the nuts are accessible for repairs and can be replaced with other similar parts adapted for other sizes or patterns of nuts.

The principles of my machine and its method of operation have the advantage that the lower pointed tip of the tap makes the incoming nut a gauge for final accurate centering and the train of tapped nuts continuously fills the curved and horizontal portions of the passage, 15, thus ensuring at all times an axial position for the horizontal or tail position of the shank 17. This is in contrast to the opposite method of threading the units on the shank and permitting them to work downward to and past the threading end of the tap. With the latter method, there is no natural or sure feed for the blanks in the horizontal and curved portions of the passage and when those portions become empty, the horizontal portion of the shank tends to skew laterally and the whole tap to drop downward to contact with the wall of passage 15, thus blocking the operation of stringing on more nut blanks until the shank has been manually pulled back to axial position.

My method also makes available well known automatic hopper feed for the blanks besides positive pusher engagement of the blank with the thread cutting head of the tap.

It is evident that for other classes of perforated articles, the cutting head of the floating tool might be a finished cutter or even a drill or the like.

I claim:

1. A nut tapping machine, including a suitable support, a nut pusher and means for operating it upward through the support to elevate nut blanks, a hollow chuck interiorly fitting the periphery of the nuts, with means for supporting and rotating said chuck in operative relation to said nut pusher, a guideway for the nuts upwardly extending above the chuck and a floating tap provided with a head on which the nuts are screwed by the chuck and with a shank extending upwardly in said guideway, centered and supported by the tapped nuts forced over the head, the upper portion of the shank and guideway being curved, and means for adjusting the curved portion of the guideway axially of the straight portion.

2. A nut tapping machine, including a suitable support, a nut pusher and means for operating it upward through the support to elevate nut blanks, a hollow chuck interiorly fitting the periphery of the nuts, with means for supporting and rotating said chuck in operative relation to said nut pusher, a guideway for the nuts upwardly extending above the chuck and a floating tap provided with a head on which the nuts are screwed by the chuck and with a shank extending upwardly in said guideway, centered and supported by the tapped nuts forced over the head, and supporting means for the operating parts of the tap, chuck and guideway hinged for rotating the same away from the nut feeding means.

3. A nut tapping machine, including a suitable support, a nut pusher and means for operating it upward through the support to elevate nut blanks, a hollow chuck interiorly fitting the periphery of the nuts, with means for supporting and rotating said chuck in operative relation to said nut pusher, a guideway for the nuts upwardly extending above the chuck and a floating tap provided with a head on which the nuts are screwed by the chuck and with a shank extending upwardly in said guideway, centered and supported by the tapped nuts forced over the head, the upper portion of the shank and guideway being curved, and means for adjusting the curved portion of the guideway axially of the straight portion, and supporting means for the operating parts of the tap, chuck and guideway hinged for rotating the same away from the nut feeding means.

4. A nut tapping machine, including a non-rotating threading tap having a head adapted to work through the perforations of the nuts, a shank in the rear of the head extending at an angle to the axis of the head and encircled by the successive threaded nuts penetrated by the tap, a rotary guide externally engaging the train of nuts on said head and formed as a chuck, driving means for rotating the chuck during upward movement of the nuts over the head, and a stationary guide engaging the train of tapped nuts and concentric with said shank whereby the continuity of the train of threaded nuts on the shank is preserved by gravity.

5. A nut tapping machine, including a non-rotating threading tap having a head adapted to work through the perforations of the nuts, a shank in the rear of the head extending at an angle to the axis of the head and encircled by the successive threaded nuts penetrated by the tap, a rotary guide externally engaging the train of nuts on said head and formed as a chuck, driving means for rotating the chuck during upward movement of the nuts over the head, a stationary guide engaging the train of tapped nuts and concentric with said shank whereby the continuity of the train of threaded nuts on the shank is preserved by gravity, and feeding means below the chuck for positively feeding nut blanks upwardly into engagement with the chuck and the tap head.

6. A nut tapping machine, including a non-rotating threading tap having a head adapted to work through the perforations of the nuts, a shank in the rear of the head extending at an angle to the axis of the head and encircled by the successive threaded nuts penetrated by the tap, a rotary guide externally engaging the train of nuts on said head and formed as a chuck, driving means for rotating the chuck during upward movement of the nuts over the head, a stationary guide engaging the train of tapped nuts and concentric with said shank whereby the continuity of the train of threaded nuts on the shank is preserved by gravity, a pusher means below the chuck for positively feeding the nut blanks upwardly into engagement with the chuck and the tap head, and means for positively positioning the nut blanks on said pusher means.

7. A nut tapping machine, including a non-rotating threading tap having a head adapted to work through the perforations of the nuts, a shank in the rear of the head extending at an angle to the axis of the head and encircled by the successive threaded nuts penetrated by the tap, a rotary guide externally engaging the train of nuts on said head and formed as a chuck, driving means for rotating the chuck during upward movement of the nuts over the head, a stationary guide engaging the train of tapped nuts and concentric with said shank whereby the continuity of the train of threaded nuts on the shank is preserved by gravity, and means for yieldingly applying opposing pressure means upon the advancing train of nuts.

8. A nut tapping machine, including a non-rotating threading tap having a head adapted to work through the perforations of the nuts, a shank in the rear of the head extending at an angle to the axis of the head and encircled by the successive threaded nuts penetrated by the tap, a rotary guide externally engaging the train of nuts on said head and formed as a chuck, driving means for rotating the chuck during upward movement of the nuts over the head, a stationary guide engaging the train of tapped nuts and concentric with said shank whereby the continuity of the train of threaded nuts on the shank is preserved by gravity, feeding means below the chuck for positively feeding nut blanks upwardly into engagement with the chuck and the tap head, and means for yieldingly applying opposing pressure means upon the advancing train of nuts.

Signed at North Tonawanda in the county of Niagara, and State of New York, this 9th day of January, A. D. 1926.

EDWARD A. MOLLNOW.